US007782886B2

(12) United States Patent
Pérez-Costa et al.

(10) Patent No.: US 7,782,886 B2
(45) Date of Patent: Aug. 24, 2010

(54) METHOD FOR IMPROVING QUALITY OF SERVICE IN A WIRELESS NETWORK

(75) Inventors: Xavier Pérez-Costa, Heidelberg (DE); Daniel Camps Mur, Heidelberg (DE)

(73) Assignee: NEC Corporation, Tokyo (JP)

( * ) Notice: Subject to any disclaimer, the term of this patent is extended or adjusted under 35 U.S.C. 154(b) by 1357 days.

(21) Appl. No.: 11/206,807

(22) Filed: Aug. 19, 2005

(65) Prior Publication Data

US 2006/0039395 A1    Feb. 23, 2006

(30) Foreign Application Priority Data

Aug. 19, 2004    (DE) .................. 10 2004 040 406

(51) Int. Cl.
*H04L 12/56* (2006.01)

(52) U.S. Cl. ...................... 370/412; 370/311

(58) Field of Classification Search ............. 370/412, 370/346, 311; 455/343.1–343.6
See application file for complete search history.

(56) References Cited

U.S. PATENT DOCUMENTS

| 5,991,287 | A  | * | 11/1999 | Diepstraten et al. | ......... 370/338 |
| 6,981,054 | B1 | * | 12/2005 | Krishna | ....................... 709/235 |
| 7,310,349 | B2 | * | 12/2007 | Beshai | ....................... 370/428 |
| 7,433,670 | B2 | * | 10/2008 | Benveniste | ............... 455/343.2 |
| 2004/0151283 | A1 | * | 8/2004 | Lazoff | .......................... 379/45 |
| 2005/0047357 | A1 | * | 3/2005 | Benveniste | .................. 370/311 |
| 2008/0052548 | A1 | * | 2/2008 | Olsen et al. | ................. 713/310 |

FOREIGN PATENT DOCUMENTS

| CN | 1414761 | 4/2003 |
| JP | 2003-60645 | 2/2003 |
| JP | 2004-173229 | 6/2004 |
| JP | 2005-65226 | 3/2005 |
| JP | 2006-74720 | 3/2006 |
| WO | 03/071740 | 8/2003 |

OTHER PUBLICATIONS

Wang, Xiaofan; Todd, Terence; Zhao, Dongmei; Kezys, Vytas "Power Saving Gateways for Real-Time Voice Handset Support in IEEE 802.11 Wireless LANs" Communications, 2004 IEEE International Conference vol. 1, Jun. 20-24, 2004 pp. 164-169 vol.1 Digital Object Identifier 10.1109/ICC.2004.1312473.*

(Continued)

*Primary Examiner*—Derrick W Ferris
*Assistant Examiner*—Christopher R Crompton
(74) *Attorney, Agent, or Firm*—Young & Thompson

(57) ABSTRACT

A method to improve the Quality of Service (QoS) in a wireless network, preferably in a WLAN according to the IEEE proposal 802.11e comprising an Access Point (AP) and at least one mobile station (STA) with different Access Categories (ACs) being defined for the transmission of frames depending on their priority, and in which a Power Save Mode (PSM), preferably according to IEEE standard 802.11, is used in the network is characterized in that the PSM queue is separated into several sub-queues at the Base Station.

17 Claims, 2 Drawing Sheets

OTHER PUBLICATIONS

Salkintzis et al., "An Outband Paging Protocol for Energy-Efficient Mobile Communications", IEEE Transactions on Broadcasting, vol. 48, No. 3, Sep. 2002, pp. 246-256.

Part 11: Wireless LAN Medium Access Control (MAC) and Physical Layer (PHY) Specifications, Nov. 1999 Edition, LAN/MAN Standards Committee.

Amendment: Medium Access Control (MAC) Quality of Service (QoS) Enhancement, Jan. 2005 Edition, LAN/MAN Committee.

Xiaofan Wang et al., Power Saving Gateways for Real-Time Voice Handset Support in IEEE 802.11 Wireless LANs, Communications, 2004 IEEE International Conference on, Jun. 24, 2004, vol. 1, pp. 164-169.

* cited by examiner

METHOD FOR IMPROVING QUALITY OF SERVICE IN A WIRELESS NETWORK

BACKGROUND OF THE INVENTION

1. Field of the Invention

The present invention relates to a method to improve Quality of Service (QoS) in a wireless network, preferably a WLAN according to the IEEE proposal 802.11e with an Access Point (AP) and at least one mobile station (STA). Different Access Categories (AC) are defined for the transmission of frames, wherein the frames are transmitted according to their priority. A Power Save Mode (PSM), preferably one according to the IEEE standard 802.11, is used in the network.

2. Description of the Related Art

Wireless networks—Wireless Local Area Networks (WLANs)—are a direct extension of wired LANs and are meanwhile widely used due to the development of the IEEE 802.11 standard family. WLANs include an Access Point (AP) as well as in general several stations (STA) with the transmission of data between the AP and the single stations being realized via a radio link. Such kinds of networks are widely used in so-called hot spot areas and offer a broadband Internet access, for example in offices, airports, hotels or conference centers.

The integration of WLANs and 3G-systems, which are currently developed intensively, offer some further interesting applications. To achieve a smooth interworking of both technologies, several prerequisites must be fulfilled though. One of the key conditions is for example the provision of guarantees of a comparable Quality of Service (QoS) for both systems, so basic services such as voice over IP (VOIP) for example, are supported. The IEEE 802.11e MAC (Medium Access Control) extension provides already functionalities to support QoS in a WLAN. In devices having 3G and WLAN-capabilities, the IEEE 802.11e proposal is therefore implemented, so applications requiring QoS guarantees, such as VoIP for example, will be supported. See IEEE 802.11 WG, IEEE 802.11e/D13.0, "Draft Supplement to Standard for Telecommunications and Information Exchange Between Systems—LAN/MAN Specific Requirements—Part 11: Wireless Medium Access Control (MAC) and Physical Layer (PHY) Specifications: Medium Access Control (MAC) Enhancements for Quality of Service (QoS)," January 2005.

When introducing wireless LAN technology into mobile devices, such as mobile phones for example, the limitations of mobile devices which are in general battery operated are to be taken into consideration. Due to the fact that transmission is performed in a WLAN over a commonly shared medium, data frames can arrive at their destination at any time, and therefore WLAN devices usually operate at full power.

In contrast, devices with restrictions due to battery reasons cannot run constantly at full power and use therefore energy saving mechanisms. In the IEEE 802.11 standard, a power save mode (PSM) is specified which can be used in such devices. See IEEE, "Wireless LAN Medium Access Control (MAC) and Physical Layer (PHY) Specifications," IEEE Standard 802.11, June 1999. In this context, problems occur with the interaction of IEEE 802.11-PSM and the 802.11e QoS mechanisms.

In the 802.11e proposal, a differentiation of the (data) traffic is defined which is based on the different priorities of the frames to be sent. The differentiation is achieved by varying different parameters. In this way, the time period a station has to identify the wireless channel in a network as being free and before starting the so-called back-off or the transmission, can be varied depending on the respective priority. Furthermore, a variation of length of the so-called Contention Window (CW) used for the back-off and a variation of the duration during which a station is allowed to send after having got access to the channel is provided.

This is realized by the introduction of four Access Categories (ACs) being assigned different priorities. In detail, these are the categories AC_VO, AC_VI, AC_BE and AC_BK with the extensions labeling the applications the respective category is intended for. VO represents Voice (highest priority), VI is video, BE is Best Effort, and BK means Background (lowest priority). The different AC queues are —depending on their priority—emptied at different rates. As each AC has its own queue, the rate at which an AC is worked on has no influence on the rest of the ACs.

FIG. 1 shows schematically in a diagram the standard storage mechanism as used in case that the Power Save Mode of standard 802.11 and the QoS extension 802.11e are used simultaneously. The implementation of two ACs is shown, with AC_VO representing a high priority class (voice) and AC_BE representing a low priority class (Best Effort). Incoming data frames are first buffered in the common PSM, no matter what priority they have. As soon as a Power Save (PS) poll request of a station is received by the AP, the corresponding frame leaves the common PSM queue and the frame undergoes a ToS (Type of Service) check. Depending on the priority of the frame, it is sorted into one of the queues, i.e. in the shown embodiment either in the AC_VO queue or in the AC_BE queue.

However, problems occur if the aforesaid QoS differentiation mechanisms are used together with the 802.11-PSM. In such a case, usually all the frames of different access categories are buffered at the Base Station or at the Access Point in the same queue—the PSM queue.

Under congestion conditions, the different service rates of the different ACs result in filling up the PSM queue with frames of low priority while frames of high priority are emptied from the PSM queue. If utilizing the normal procedure saying that in case of a full queue newly arriving frames will be dropped, the performance of ACs of high priority will suffer a significant degradation as most of the frames of high priority will directly be discarded because the PSM queue is filled up with frames of low priority.

Due to the service rates which depend on the priorities that are different for the ACs, the PSM queue fills up with frames of low priority. If the buffer of a PSM queue is full, newly incoming frames at the PSM queue are usually discarded. Under congestion conditions, i.e. when the buffer at the PSM queue is full, the service of the AC VO suffers therefore a significant degradation, due to the slower service rate of low priority frames. As a result, the utilization of the standard PSM has a contrary effect regarding the desired functionality of 802.11e.

A possible approach to avoid the above described problem is to modify the default behavior of the queue system. A modification could be done in such a way that not the newly arriving frames are discarded, but that the oldest frames are discarded and replaced by newly arriving frames. This solution would basically enhance the performance of the system but it would not guarantee for all cases that frames of high priority will not be dropped for newer frames of a lower priority.

SUMMARY OF THE INVENTION

The present invention is therefore based on the task to design and further develop a generic method to improve the Quality of Service (QoS) in a network of the aforementioned kind with easy means in order to enable a transmission of frames depending on their priority at the lowest energy consumption possible.

The method according to the invention of providing Quality of Service (QoS) in a network solves the aforesaid problem by the characteristics disclosed below. According to this, such a method is characterized in that the PSM queue is divided into several sub-queues at the access point.

According to the present invention, it has been recognized that the joint utilization of the 802.11 Power Save Mode with the 802.11e MAC extension cannot guarantee a sufficient quality of service because the low AP PSM queue emptying rates of low priority ACs can lead to a too high portion of loss of frames of high priority in the Access Point (AP), so real-time applications like voice cannot be realized.

Furthermore, it has been recognized that frame losses of ACs of high priority due to the low emptying rate of ACs of low priority can be avoided by dividing the PSM queue at Base Station or at the Access Point into several sub-queues and therefore separating the single ACs of each other.

Regarding its low complexity, the method according to the invention is easy to implement, in particular so as no modifications of the stations will be necessary. At the Access Point, storage space for several sub-queues can be provided instead of a common PSM queue. The incoming frames will consequently not be buffered in a common PSM queue, but in the corresponding sub-queues. The rest of the PSM operations can remain unaltered, except for the fact that with the method according to the invention instead of the common PSM queue, several different PSM sub-queues have to be checked regarding the presence of data frames.

In the context of a concrete embodiment, a logical separation of the PSM queue into sub-queues is provided. Alternatively, a physical separation of the PSM queue can be provided. By logical separation we refer to the division of the PSM queue capacity in order to emulate several sub-queues. By physical separation we refer to the introduction of new queues.

In a particularly advantageous way, the PSM queue is divided into a number of sub-queues corresponding to the number of ACs, so every sub-queue can be assigned to a concrete AC.

Now, there are several options of how to design and to further develop the teaching of the present invention in an advantageous way. For this purpose, it must be referred to the following explanation of the example of a preferred embodiment of the invention by the aid of the drawing. In connection with the explanation of the preferred embodiment of the invention according to the drawing, the generally preferred designs and further developments of the teaching will be explained.

DESCRIPTION OF THE PREFERRED EMBODIMENT

Figure 1:
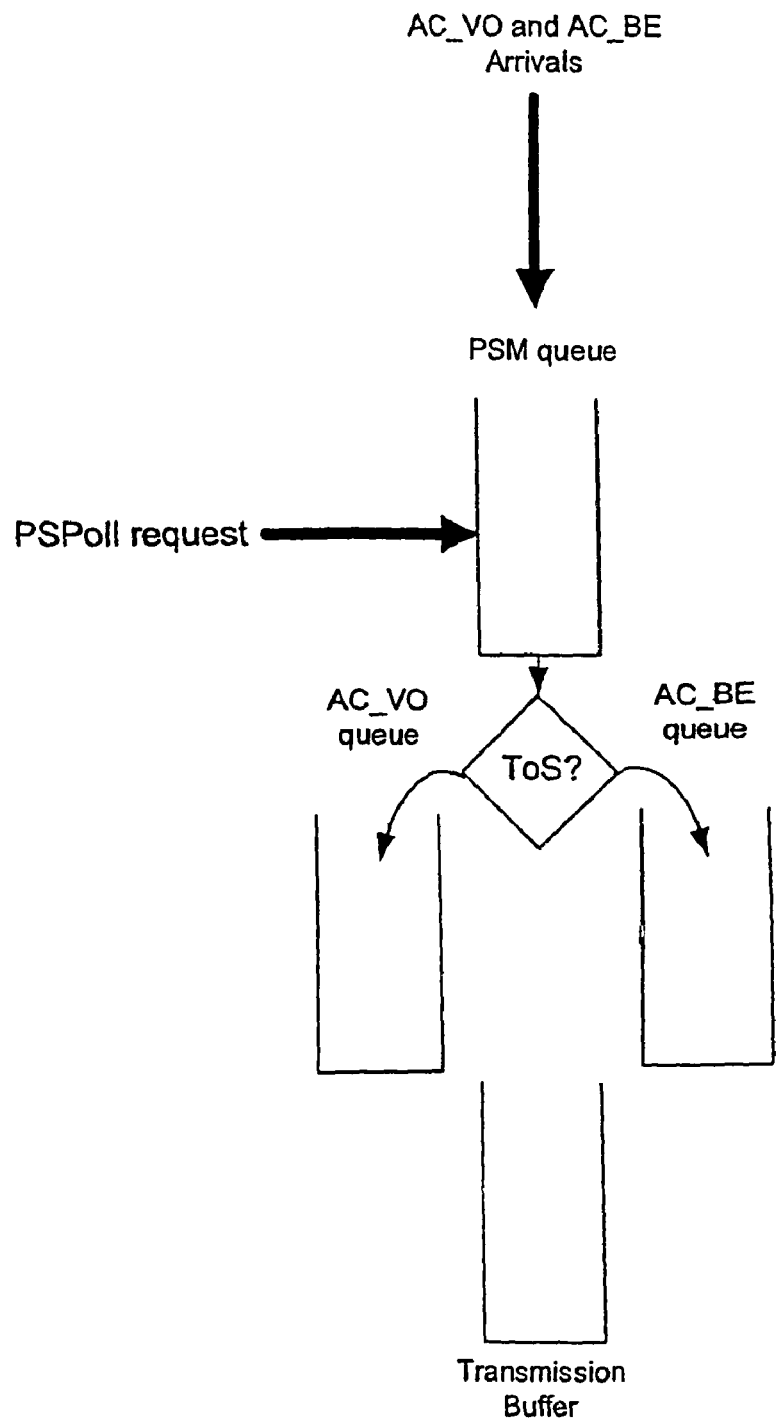
FIG. 1 is a block diagram shows a diagram of a standard implementation of a QoS differentiation mechanism using the PSM according to standard 802.11.
Figure 2:
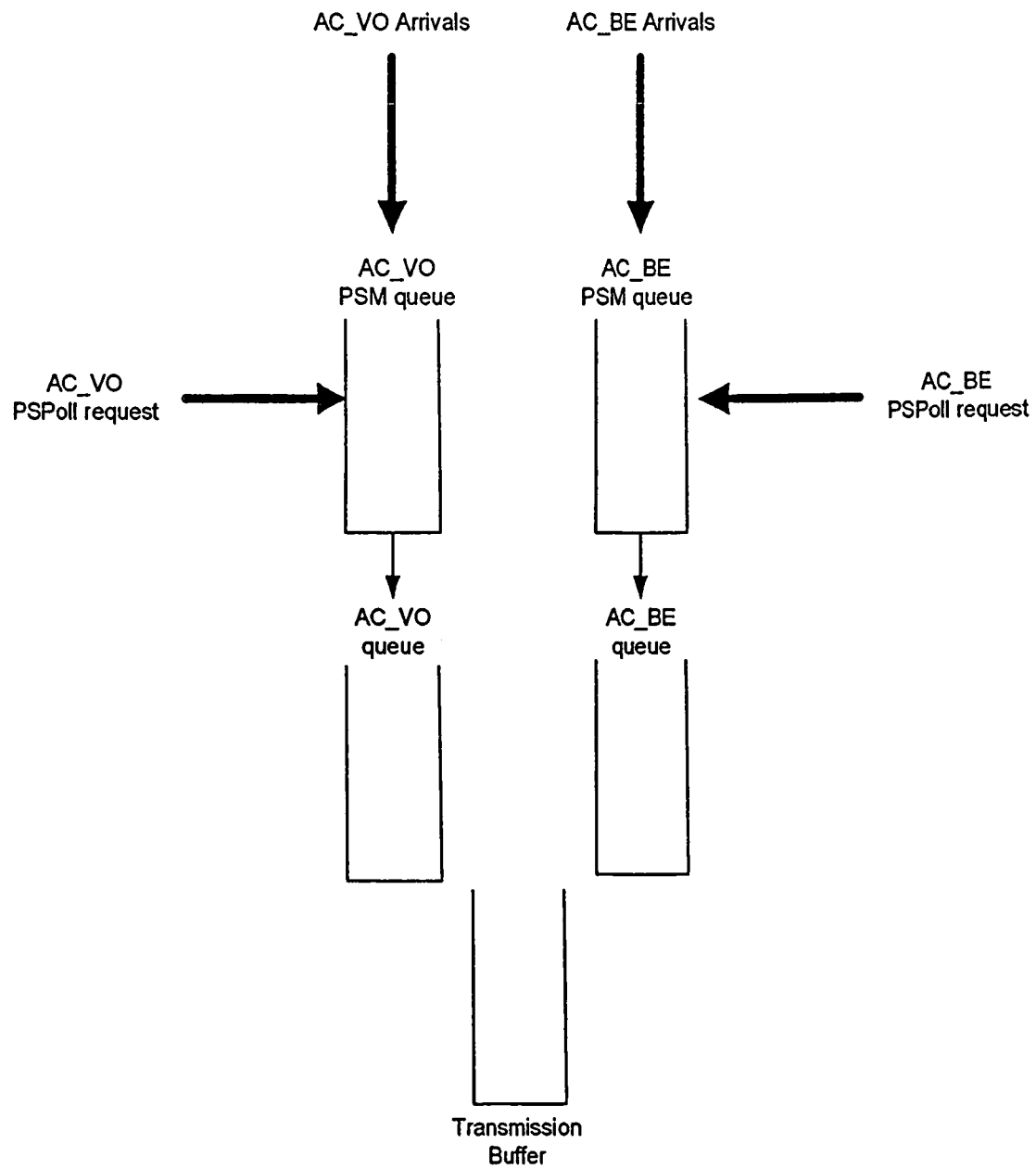
FIG. 2 shows a diagram of an example according to an embodiment of the invention with a physical separation of the PSM queues as two sub-queues.

Referring to FIG. 2, a common PSM queue is separated into two sub-queues according to the implemented number of ACs. To be concrete, the queue is separated into an AC_VO PSM sub-queue in which frames of high priority are sorted, and into an AC_BE PSM sub-queue in which frames of low priority are sorted. These PSM sub-queues may be formed by logically dividing a single PSM queue, or by physically providing two queues. In addition, a plurality of queues are provided for respective ones of priorities.

As shown in FIG. 2, it is first determined which priority an incoming data frame has. When it is a high-priority frame, it is buffered in the AC_VO PSM sub-queue and, when a low-priority frame, it is buffered in the AC_BE PSM sub-queue. When a PS (power save)-poll request has been received from a mobile station, a corresponding frame leaves a corresponding PSM sub-queue and is transferred to a corresponding queue. For example, when an AC_VO PS-poll request has been received from a mobile station requesting AC_VO, the AC_VO PSM sub-queue is searched and frames for the mobile station are transferred to the AC_VO queue. Thereafter, the frames are sent to the mobile station through the transmission buffer.

By separating the PSM queue into two separate sub-queues it is achieved that the service of the AC_VO is not affected by the slower service rate of the AC_BE, so losses of frames of high priority is avoided to the greatest possible extent.

Finally, we would like to draw expressly attention to the fact that the above described example of embodiment serves as a mere illustration of the claimed teaching, but that it does by no means restrict the latter to the given example of embodiment.

The invention claimed is:

1. A method for improving Quality of Service (QoS) in a wireless network comprising an access point and at least one mobile station, wherein the wireless network is operable in a power save mode (PSM) and supports Quality of Service, comprising:

defining different access categories for transmission of frames depending on their priority; and separating a PSM queue into a plurality of sub-queues at the access point and upon receiving a request from a mobile station accommodated in the access point, searching a PSM sub-queue for frame transmission to the mobile station, wherein said separating step separates the PSM queue into a plurality of PSM sub-queues at the access point including at least a first PSM sub-queue of first priority frames and a second PSM sub-queue of second priority frames, the first PSM sub-queue being connected to a first queue for the first priority frames and the second PSM sub-queue being connected to a second queue for the second priority frames, the first and second queues being connected to a transmission buffer, and further comprising the steps of:

receiving a request from a first mobile station for first priority frames, searching the first priority PSM sub-queue for first priority frames for the first mobile station and then transferring the corresponding first priority frames for the first mobile station from the first PSM sub-queue to the first queue;

receiving a request from a second mobile station for first priority frames, searching the first priority PSM sub-queue for first priority frames for the second mobile station and then transferring the corresponding first priority frames for the second mobile station from the first PSM sub-queue to the first queue; and from the first queue containing both i) the first priority frames for the first mobile station transferred from the first PSM sub-queue to the first queue and ii) first priority frames for the second mobile station transferred from the first PSM sub-queue to the first queue, sending the respective corresponding first priority frames requested by the first mobile station to the first mobile station and sending the first priority frames requested by the second mobile station to the second mobile station, the first priority frames being sent through the transmission buffer.

2. The method according to claim 1, wherein the PSM queue is logically separated into the plurality of sub-queues.

3. The method according to claim 1, wherein the PSM queue is physically separated into the plurality of sub-queues.

4. The method according to claim 1, wherein the PSM queue is separated into a number of sub-queues corresponding to the number of access categories.

5. The method according to claim 1, wherein the power save mode (PSM) conforms to IEEE standard 802.11.

6. The method according to claim 1, wherein, the first priority frames are of an access category representing voice frames and the second priority frames are of an access category representing i) video frames, ii) best effort frames, and iii) background frames.

7. The method according to claim 1, wherein,
said separating step further comprises separating the PSM queue at the access point into a third PSM sub-queue of third priority frames and a fourth PSM sub-queue of fourth priority frames, the third PSM sub-queue being connected to a third queue for the third priority frames and the fourth PSM sub-queue being connected to a fourth queue for the fourth priority frames, the third and fourth queues being connected to a transmission buffer, and
the first priority frames are of a first access category representing voice frames, the second priority frames are of a second access category video frames, the third priority frames are of a third access category representing best effort frames, and the fourth priority frames are of a fourth access category representing background frames.

8. The method according to claim 1, wherein,
the first priority frames are of an access category representing voice frames and the second priority frames are of an access category representing best effort frames.

9. The method according to claim 1, wherein,
said request is a power save-poll request, and
said separating step comprises, upon receiving the power save-poll request from the mobile station accommodated in the access point, searching the PSM sub-queue corresponding to a priority of the request to select frames corresponding to the request for transmission to the mobile station.

10. The method according to claim 1, wherein,
said request is a power save-poll request, and
said separating step comprises, upon receiving the power save-poll request from the mobile station accommodated in the access point, searching the PSM sub-queue based on a priority of the request to select frames corresponding to the request for transmission to the mobile station.

11. An access point of a wireless network which is operable in a power save mode (PSM) and supports Quality of Service, said access point comprising:
a plurality of PSM sub-queues defined based on priority for transmission of frames, said plurality of PSM sub-queues including at least a first PSM sub-queue of first priority frames and a second PSM sub-queue of second priority frames, the first PSM sub-queue being connected to a first queue for the first priority frames and the second PSM sub-queue being connected to a second queue for the second priority frames, the first and second queues being connected to a transmission buffer, wherein an incoming frame with priority is stored in a corresponding one of the PSM sub-queues and the incoming frames are held in the PSM sub-queues until i) receiving a request from a mobile station accommodated in the access point, and ii) upon receiving the request, searching a PSM sub-queue and selecting frames for transmission to the mobile station;
a plurality of queues for storing frames read out from the plurality of PSM sub-queues according to their priority, each queue for storing frames corresponding to a different one of the PSM sub-queues; and
the transmission buffer for storing frames read out from the plurality of queues depending on their priority,
wherein, i) upon receiving the request from a first mobile station for first priority frames, the first priority PSM sub-queue is searched for first priority frames for the first mobile station and the corresponding first priority frames for the first mobile station are transferred from the first PSM sub-queue to the first queue, and ii) upon receiving the request from a second mobile station for first priority frames, first priority PSM sub-queue is searched for first priority frames for the second mobile station and then the corresponding first priority frames for the second mobile station are transferred from the first PSM sub-queue to the first queue, and
wherein, from the first queue containing both i) the first priority frames for the first mobile station transferred from the first PSM sub-queue to the first queue and ii) first priority frames for the second mobile station transferred from the first PSM sub-queue to the first queue, the respective corresponding first priority frames requested by the first mobile station are sent to the first mobile station and the first priority frames requested by the second mobile station are sent to the second mobile station, the first priority frames being sent through the transmission buffer.

12. The access point of claim 11, wherein,
each of the queues is connected to an output of a corresponding one of the sub-queues, and
the transmission buffer is connected to an output of each of the plurality of queues for wireless transmission to at least one mobile station.

13. An access point according to claim 11, wherein,
said request is a power save-poll request, and
the incoming frame with priority is stored in the corresponding one of the PSM sub-queues and the incoming frames are held in the PSM sub-queues until i) receiving the power-save poll request from a mobile station accommodated in the access point, and ii) upon searching the PSM sub-queue corresponding to a priority of the request selecting frames corresponding to the request for transmission to the mobile station.

14. An access point according to claim 11, wherein,
said request is a power save-poll request, and
the incoming frame with priority is stored in the corresponding one of the PSM sub-queues and the incoming frames are held in the PSM sub-queues until i) receiving the power-save poll request from a mobile station accommodated in the access point, and ii) upon searching the PSM sub-queue based on a priority of the request selecting frames corresponding to the request for transmission to the mobile station.

15. A control method in an access point of a wireless network which is operable in a power save mode (PSM) and supports Quality of Service, said method comprising said access point performing the steps of:

storing an incoming frame with priority into one selected PSM sub-queue from a plurality of PSM sub-queues defined based on priority for transmission of frames, the plurality of PSM sub-queues including at least a first PSM sub-queue of first priority frames and a second PSM sub-queue of second priority frames, the first PSM sub-queue being connected to a first queue for the first priority frames and the second PSM sub-queue being connected to a second queue for the second priority frames, the first and second queues being connected to a transmission buffer;

when receiving a request from a mobile station accommodated in the access point, searching a PSM sub-queue corresponding to a priority of the request to select frames corresponding to the request, said receiving step including i) receiving a request from a first mobile station for first priority frames, searching the first priority PSM sub-queue for first priority frames for the first mobile station and then transferring the corresponding first priority frames for the first mobile station from the first PSM sub-queue to the first queue, and ii) receiving a request from a second mobile station for first priority frames, searching the first priority PSM sub-queue for first priority frames for the second mobile station and then transferring the corresponding first priority frames for the second mobile station from the first PSM sub-queue to the first queue; and transmitting selected frames to the mobile station which has transmitted the request, wherein, from the first queue containing both i) the first priority frames for the first mobile station transferred from the first PSM sub-queue to the first queue and ii) first priority frames for the second mobile station transferred from the first PSM sub-queue to the first queue, sending the respective corresponding first priority frames requested by the first mobile station to the first mobile station and sending the first priority frames requested by the second mobile station to the second mobile station, the first priority frames being sent through the transmission buffer.

16. The control method of claim 15, wherein, when receiving the request from the mobile station accommodated in the access point, the selected frames are searched for corresponding to the requesting mobile station for transmitting the selected frames to the requesting mobile station which has transmitted the request.

17. The control method of claim 15, wherein, said request is a power save-poll request.

* * * * *